US010729114B2

(12) United States Patent
St. John

(10) Patent No.: US 10,729,114 B2
(45) Date of Patent: Aug. 4, 2020

(54) SWIMBAITS WITH FLUTTERING DUAL PLANE TAIL ROTATION

(71) Applicant: Joshua Aaron St. John, Richmond, CA (US)

(72) Inventor: Joshua Aaron St. John, Richmond, CA (US)

( * ) Notice: Subject to any disclaimer, the term of this patent is extended or adjusted under 35 U.S.C. 154(b) by 263 days.

(21) Appl. No.: 15/236,426

(22) Filed: Aug. 13, 2016

(65) Prior Publication Data

US 2018/0042206 A1 Feb. 15, 2018

(51) Int. Cl.
*A01K 85/12* (2006.01)
*A01K 85/00* (2006.01)

(52) U.S. Cl.
CPC .............. *A01K 85/12* (2013.01); *A01K 85/00* (2013.01)

(58) Field of Classification Search
CPC ................................ A01K 85/00; A01K 85/12
See application file for complete search history.

(56) References Cited

U.S. PATENT DOCUMENTS

| | | | | |
|---|---|---|---|---|
| 3,218,750 A * | 11/1965 | Lewin | ..................... | A01K 85/16 43/42.28 |
| 3,445,953 A * | 5/1969 | Dailey | ................... | A01K 85/16 43/17.1 |
| 3,879,882 A * | 4/1975 | Rask | ....................... | A01K 85/16 43/42.28 |
| 3,986,291 A * | 10/1976 | Hopper | .................. | A01K 85/00 43/42.06 |
| 4,047,318 A * | 9/1977 | Mapp | ..................... | A01K 85/00 43/42.24 |
| 4,074,455 A * | 2/1978 | Williams, Jr. | ......... | A01K 85/01 428/16 |
| 4,317,305 A * | 3/1982 | Firmin | ................... | A01K 85/16 43/42.24 |
| 5,193,299 A * | 3/1993 | Correll | .................... | A01K 85/00 43/42.24 |
| 5,456,039 A * | 10/1995 | Pisoni | .................... | A01K 85/00 43/42.24 |
| 5,640,798 A * | 6/1997 | Garst | ..................... | A01K 85/00 264/328.1 |
| 6,041,540 A * | 3/2000 | Potts | ...................... | A01K 85/00 43/42.08 |
| 6,141,900 A * | 11/2000 | Rudolph | ................ | A01K 83/06 43/42.24 |

(Continued)

FOREIGN PATENT DOCUMENTS

WO WO-2015004649 A1 * 1/2015 ............. A01K 85/00

*Primary Examiner* — Michael H Wang
(74) *Attorney, Agent, or Firm* — DLA Piper LLP (US)

(57) ABSTRACT

Generally, the invention disclosed herein relates to articles for catching and capturing fish. Embodiments of this invention may be used as baits to attract fish and entice them to take a hook. Optionally, the hook may be embedded in—or otherwise attached to—the bait. Examples of this invention may be designed to resemble the appearance of naturally occurring fish species and may exhibit realistic or exaggerated movement when traveling through water. Some embodiments comprise tail portions designed to flutter by simultaneously moving along two axes of rotation. Fluttering may comprise lateral—side-to-side—motion along a vertical axis extending from the tail neck and rotational displacement along a horizontal axis extending from the center of the tail portion.

16 Claims, 13 Drawing Sheets

(56) References Cited

U.S. PATENT DOCUMENTS

| | | | | |
|---|---|---|---|---|
| 6,363,651 B1* | 4/2002 | Garst | ............... | A01K 85/00 43/42.24 |
| 6,393,755 B1* | 5/2002 | Weaver | ............ | A01K 85/01 43/42.03 |
| 7,080,476 B2* | 7/2006 | King | ............... | A01K 85/00 43/42.24 |
| 7,627,979 B2* | 12/2009 | Huddleston | ......... | A01K 85/00 43/42.22 |
| 8,959,827 B1* | 2/2015 | Hale | ............... | A01K 85/00 43/42.24 |
| 8,966,810 B2* | 3/2015 | Scott | ............... | A01K 85/00 43/42.03 |

* cited by examiner

Tail Portion

Fish Body

Fish Body

Tail Portion

Harness Region

Tail Design 1

Tail Design 2

Tail Design 3

SWIMBAITS WITH FLUTTERING DUAL PLANE TAIL ROTATION

FIELD OF INVENTION

This invention relates to the technical field of catching and capturing fish. More specifically, this invention relates to the art of lure making.

BACKGROUND

The practice of catching fish has existed for millennia. Over the years, both man and beast have advanced the art by adopting numerous methods for making fishing easier and more efficient. The art of modern lure making dates back to the 1920s. Most man-made baits from this era consist of wooden objects with rudimentary mechanical action. The simple Dowagiac line of casting baits produced by Heddon typify the lures of this time period with a buoyant wooden body draped in metallic fishhooks. More recently, the adoption of hard—then soft—plastics as primary lure materials catalyzed an innovative new class of lures known as swimbaits. The first swimbaits where made by the likes of Allen Cole, the Godfather of swimbaits, in Southern California during the mid 1990s. Early models, such as Cole's AC Plug, revolutionized freshwater trophy fishing by adopting modified versions of big sea plastic baits. The AC Plug combines a wooden body with a soft flexible tail to imitate the swimming motion of actual fish and quickly became notorious for catching big game fish. In the quarter century since their introduction, swimbaits have continued to develop with American firms like Pradco and Strike King competing against International firms like Japanese Lucky Craft for control of the international lure market.

In the new millennium, demand for condition optimized fishing lures is flourishing. As fishermen become more aware of the effects water temperature and turbidity, climate, geography, and fish species have on lure performance, they seek custom lures optimized to perform in particular conditions. To meet demand, craftsman in the emerging bespoke art of lure making carefully machine lures that use the principles of drag and resistance to create swimbaits with distinct behavior if pulled through water at a sufficient flow velocity. Embodiments of this art may be comprised of modular body and tail portions that may be optimized to create a shape and motion designed to attract a particular species of fish under certain climate and water conditions.

Many of the same aerodynamic principles used in the aerospace industry influence the hydrodynamic properties of swim baits. These principles include resistance, drag, form drag, interference drag, skin friction, and Reynolds number. Drag, or resistance, is a force acting on solid bodies moving through air or water. The total drag force can be divided into several different components including form drag, interference drag, and skin friction. Form drag is caused by exposure of frontal and leading side areas of an object to flowing fluid. This drag component is influenced by the shape of an object, and is the reason streamlining increases efficiency and speed. Interference drag is caused by interference of fluid flow between adjacent parts of an object, for example the intersection of the tail neck and tail forks. In aviation, interference drag is common at the intersection of the wing and tail sections with the fuselage. In this case, fairings are used to streamline these intersections and decrease interference drag. In the context of fishing lures, interference drag can be created by appendages extending from the fish lure body at steep angles. At high flow velocities, interference drag can help spawn vortices, eddies, and areas of turbulent flow capable of influencing lure movement in the water. Skin friction drag is caused by fluid passing over the surface of an object and increases considerably if the object's surfaces are rough or dirty. Surface friction constitutes two-thirds of an object's total thus, the total force 'F' is made up of two components: (i) surface friction: $2\pi\mu du$ and (ii) form drag: $\pi\mu du$.

In addition to drag and resistance caused by the shape of an object, the object's motion in a fluid is characterized by the fluid flowing over the object. Reynolds number, Re, represents the relationship between the fluid and the object and is equal to $ud\rho/\mu$ in which '$\rho$' is the density of the fluid, '$\mu$' is the viscosity of the fluid, '$d$' is the diameter of the object and '$u$' is the velocity of the fluid relative to the particle. At high Reynolds numbers—usually at high flow velocities when the fluid is water—the boundary layer between the object and the flowing liquid can separate creating vortices and eddies. As velocity increases, the size of the generated vortices also increases. At Reynolds Numbers greater than 20, flow separation occurs with the formation of vortices in the wake of the object. At Re values between 100 and 200, instabilities in the flow give rise to vortex shedding.

Under the principles outlined above, the motion of swimbait lures depends primarily on the shape of the lure body, the texture of the lure's surface, and the velocity at which the lure travels through water. In addition to the effect of vortices, eddies, and turbulent flow on the lure, the tendency of swim baits to exhibit more movement at higher flow velocities can be explained by Bernoulli's principle—a concept from aerodynamics explaining the lift of an airplane wing. Bernoulli's equation relates an increase in flow velocity to a decrease in pressure and vice versa. Accordingly, at higher flow velocities lures are less constrained by the pressure of water flowing past their surfaces and therefore freer to move about. For this reason, most swimbaits are effective only at a range of elevated flow velocities limiting the use of this type of lure. One of the primary objects of this invention is to create a novel fishing lure that overcomes this flow velocity limitation by retaining swimbait like motion when fished at low velocities—or jigged—and when fished in cold conditions where the lure material is stiffer and sink rates slower.

SUMMARY OF INVENTION

This invention relates to fishing lures and presents a new design aimed at advancing the art swimbaits and fishing in general. Specifically, embodiments of this invention are comprised of advanced materials, such as soft plastol, soft silicone, and microsphere core resin for enhancing the durability, swimming action, and ease of customization of swimbaits. Some examples have a more detailed, life-like body design with numerous, oversized appendages extending from the fish body. These appendages may be positioned as fins to enhance the realistic appearance of the bait or simply extend outwardly from the fish body to increase drag interactions and produce secondary action as the lure travels through the water. Additionally, new tail shapes designed to improve the swimming action of swimbaits are presented. In some embodiments, these designs have a novel fluttering movement comprising three-dimensional motion along multiple axes of rotation. Other embodiments comprise tails designed to enhance motion at low flow velocities enabling tail movement at slow speeds for more effective jig fishing and fishing in cold conditions. These and other problems are generally solved or circumvented, and the technical advantages generally achieved, by the preferred embodiments of the present invention described below.

DETAILED DESCRIPTION

Preferred Lure Shape Examples

FIGS. 1-5 depict side perspective views of five different fish lure body shapes. Each body design comprises a realistic shad tail profile to imitate the appearance of a prey fish species. These lure embodiments may be composed of at least one of a plastol, soft polymer, or soft silicone material molded in the shape of a trout, bluegill, catfish, baby bass, crappie, squaw fish, hitch, sculpin, shad or other bait fish. Both the body portions and appendages, including fins and tail, may be grooved, scaled, or otherwise textured to give a more realistic appearance and affect lure behavior in the water. Scale texturing and grooving increases the lure's drag by enhancing its skin friction. Although the increased drag caused by textured surfaces makes it harder to pull the lure through the water upon retrieval, higher skin friction produces a ticker boundary layer and may cause separation at elevated retrieval velocities. In some embodiments, this separation causes eddies and vortices to form as the flow of water around the fish lure changes from streamlined to turbulent. In turn, eddies and vortices move the tail and fins to produce a swimming motion optimized for attracting and fooling prey fish.

Figure 1:
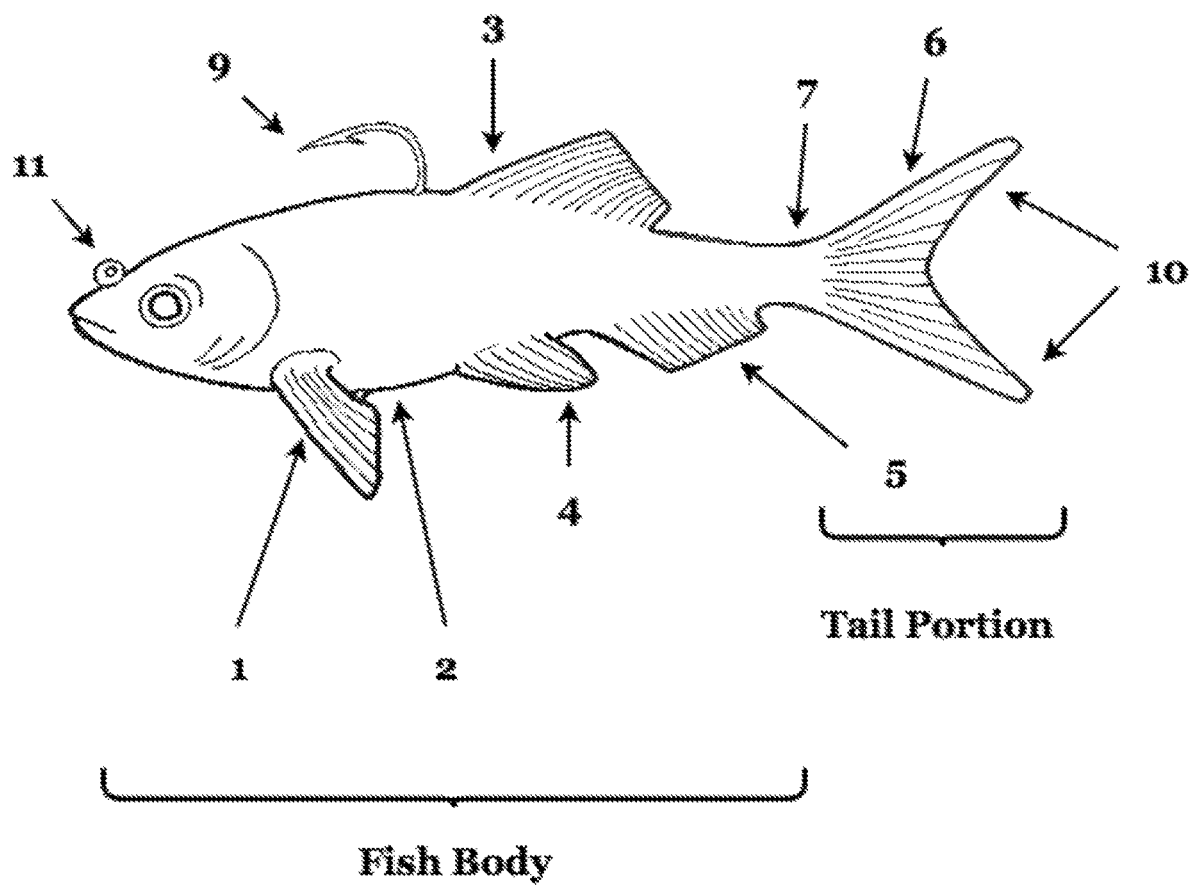
FIG. 1 is a side perspective view of a lure embodiment designed to resemble a hitch. In this example, the fins and tail appendages are grooved but the fish body portion is not textured.

Each fish lure embodiment is divided into two main parts, the forward fish body portion and the aft tail portion. These portions meet and may overlap at the tail neck 7 region of the lure. In the embodiment of FIG. 1, the fish body 1 tapers from its tallest point near the dorsal fin 3 to a very narrow tail neck 7 near the anal fin 5. The fish body 1 in this example is designed to be broader than the tail neck 7 in order to increase the lure's form drag coefficient. The higher form drag coefficient provided by the broader leading edge causes more pressure to be exerted on the fish body 1 relative to the tail neck 7. This difference in pressure causes the fish body to track a straight course while the fish tail is allowed a greater range of movement when the lure is pulled through the water. A jig hook 9 attached to a harness embedded in the fish body 1 may also be included in the lure. Optionally, a loop 11 may be attached to the embedded harness as an attachment point for extra weight, for example an anchoring piece of lead, or for the end of a fishing line or table hook.

The tail forks 10 of this embodiment are oversized relative to the tail neck 7 and may be as thick as—or thicker than—the widest part of the fish body 1. Additionally, in one embodiment, the steep angle of intersection between of the tail neck 7 and tail forks 10 produces a rapid increase in form drag as well as interference drag at this location. Increased drag in this region may cause the caudal fin 6 to flutter or move simultaneously in a vertical and horizontal direction as the lure is pulled through the water.

Figure 2:
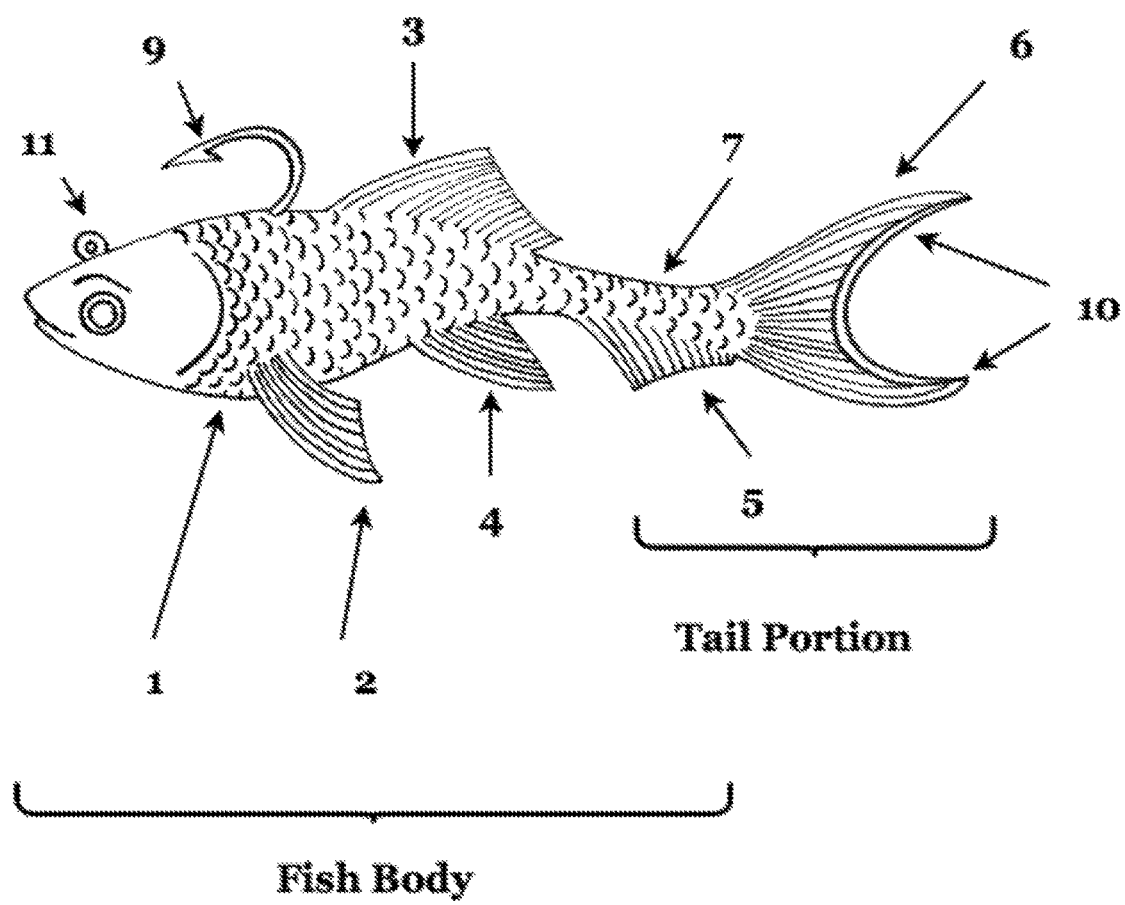
FIG. 2 is a side perspective view of a lure embodiment designed to resemble a generic baitfish. In this example, both the appendages and fish body portion are textured.

FIG. 2 illustrates the side view of another example fish lure embodiment. This embodiment contains all of the same components—1-11—of the example in FIG. 1, but has several design differences. In this example, both the fish body 1 and the tail neck 7 are textured to give the appearance of scales. The tail neck 7 is also narrower than the embodiment depicted in FIG. 1. This narrower lure tail portion causes the lure in FIG. 2 has a greater range of motion than the tail portion of the lure in FIG. 1. The tail fork components 10 of the caudal fin 6 are also more curved in the example pictured in FIG. 2. This more streamlined, lower drag tail shape causes the lure in FIG. 2 to more easily travel through the water. This faster flow velocity, however, reduces the motion of the lure's tail portion by producing greater hydrodynamic pressure at this location.

Figure 3:
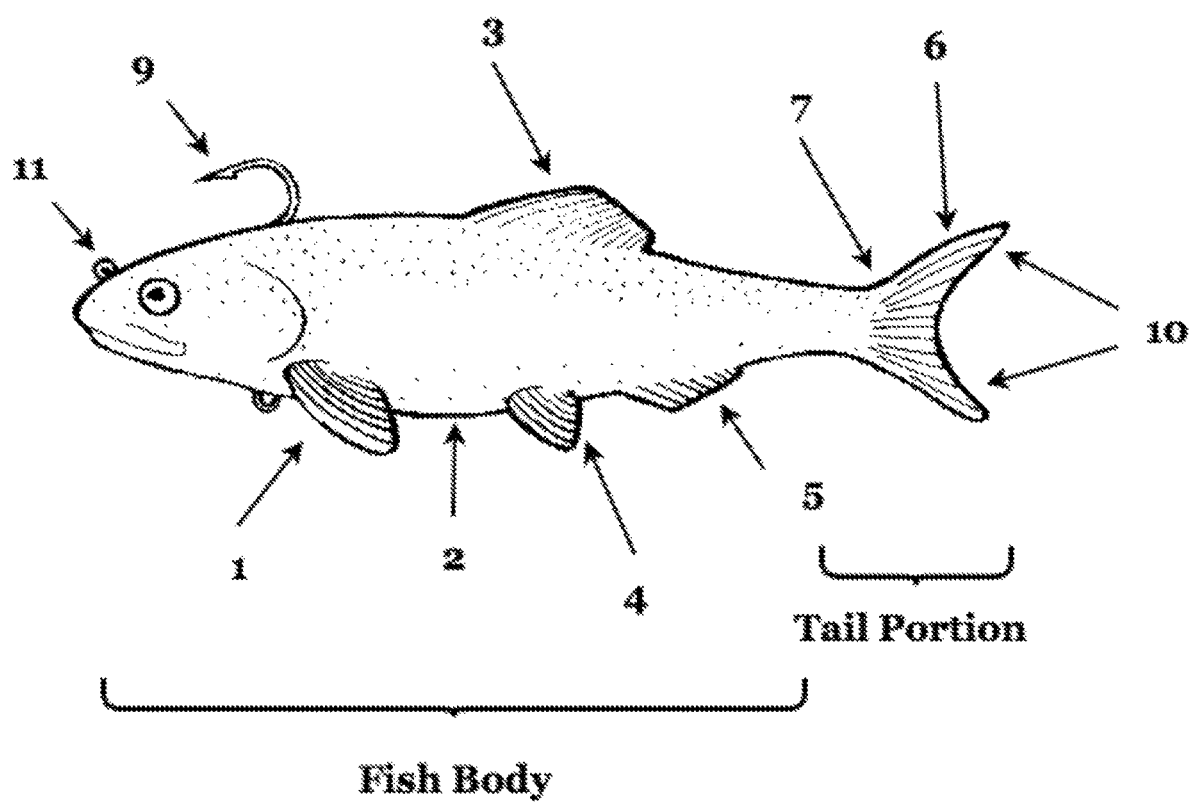
FIG. 3 is a side perspective view of a lure embodiment designed to resemble a trout. In this example both the appendages and fish body portion are textured.
Figure 4:
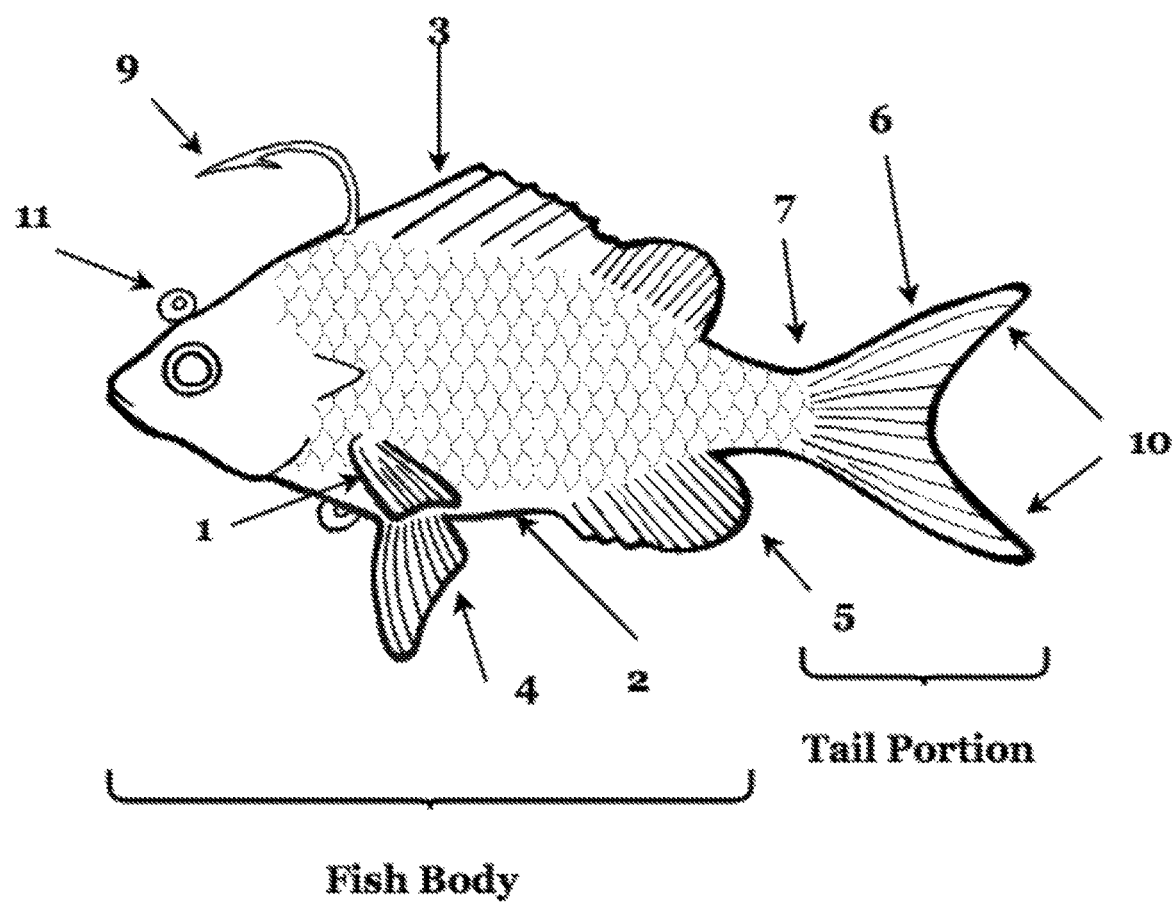
FIG. 4 is a side perspective view of a lure embodiment designed to resemble a bluegill. In this embodiment, both the appendages and fish body portion are textured.
Figure 5:
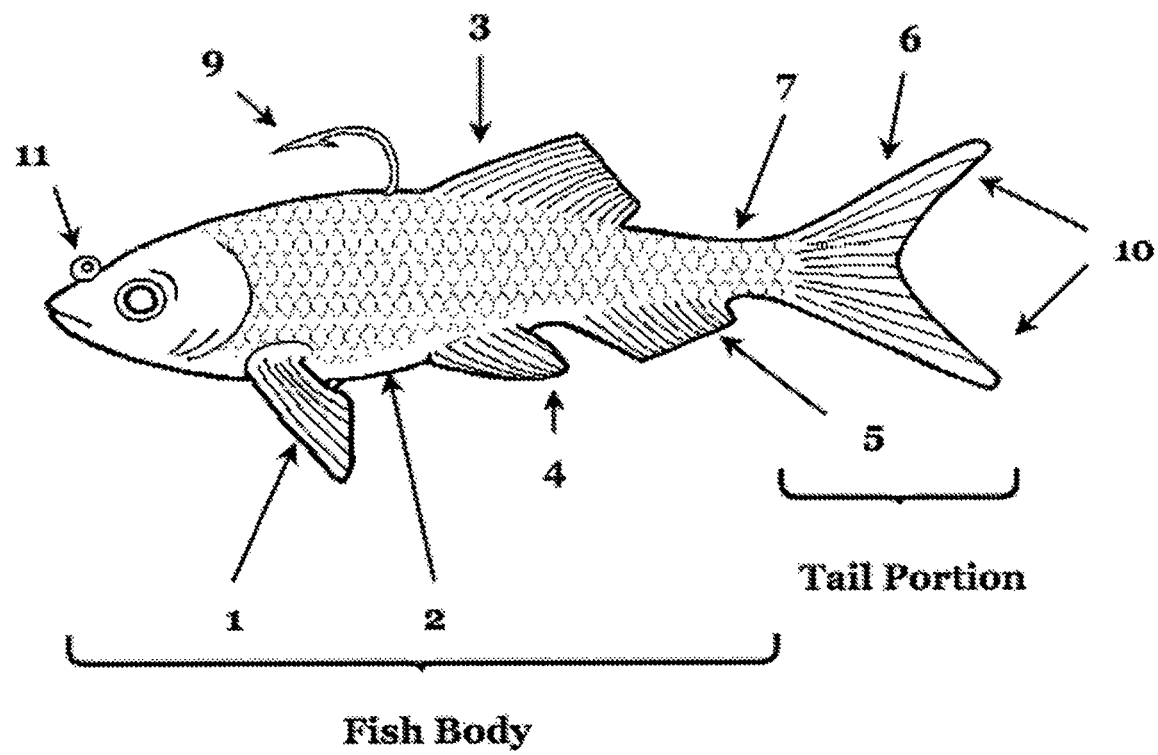
FIG. 5 is a side perspective view of a lure embodiment designed to resemble a hitch. In this example the appendages and fish body portion are both textured.

FIGS. 3-5 similarly contain all of the same components—1-11—as FIGS. 1-2 but have different body shapes and textures. FIG. 3 is designed to resemble a trout. In this example, both the appendages and fish body portion are textured. FIG. 4 is designed to resemble a bluegill. In this embodiment, both the appendages and fish body portion are textured. Like FIG. 1, FIG. 5 is also designed to resemble a hitch. In this example, however, both the appendages and fish body portion are textured.

Figure 6:
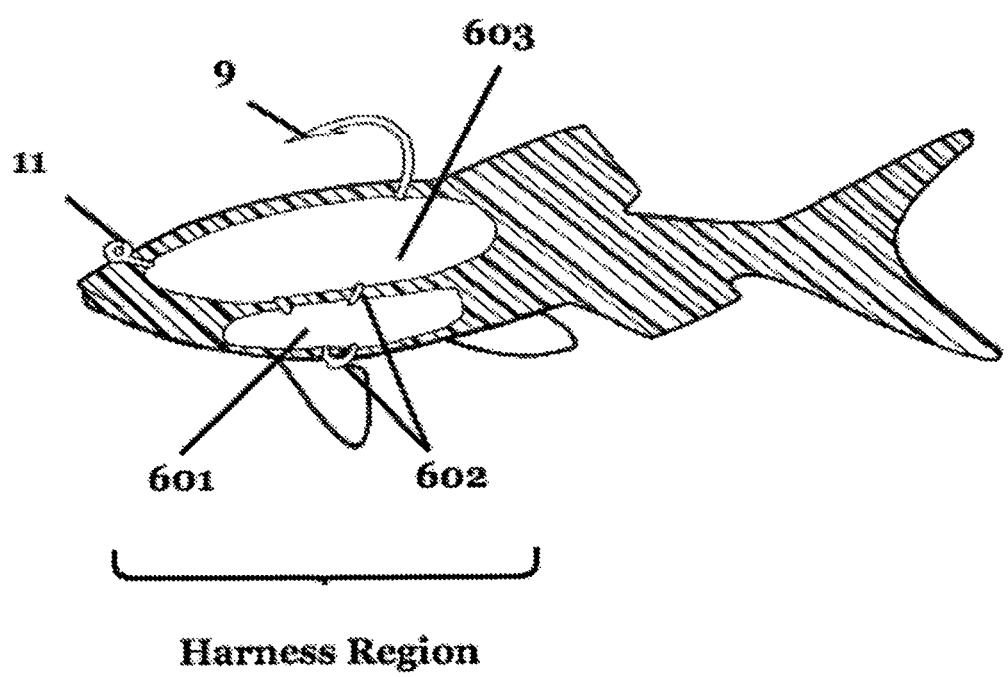
FIG. 6 is a cross sectional view of a lure embodiment with an embedded harness comprising a buoyancy-ballast system.

FIG. 6 is a cross-sectional depiction of the fish lure embodiment displayed in FIG. 1. This view shows one example of a harness that may be embedded in at least one fish body portion of the lures disclosed herein. The harness in this example may comprise a buoyancy ballast system to make the bait stable and prevent it from rolling during sinking or retrieval. In one example, the buoyancy component 603 may be comprised of a resin and microsphere core designed secure the hook 9 and loop 11 firmly to the harness so that is does not loosen or dethatch during or after use. In one embodiment, the microsphere resin buoyancy component 603 keeps the lure floating upright in the water. In this example, the ballast component 601 of the harness is positioned just below the buoyancy component 603 and optionally is comprised of lead. The ballast component 601 counter-acts the buoyancy component 603 and causes the lure to sink at a controlled rate in a realistic horizontal fashion once cast into the water. The ballast component also ensures the bait does not wobble and maintains a life-like, straight trajectory upon retrieval. A wire 602 connects the buoyancy component 3 to the ballast component 601 and also secures the hook 9 and loop 11 to the harness.

Figure 7:
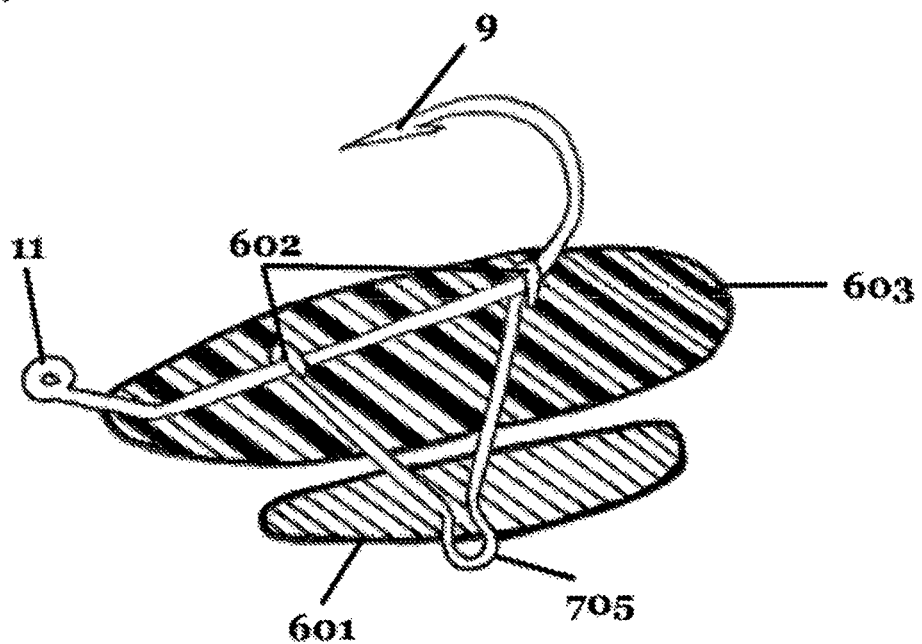
FIG. 7 is a cross sectional view of a harness comprising a buoyancy-ballast system and u-shaped bends.

FIG. 7 is a cross-sectional view of the harness. This perspective shows the wire 602 connecting the buoyancy component 603 to ballast component 601. The wire 602 portion securing the hook 9 and the loop 11 to the harness is also entirely visible. The wire 602 contains two U shaped bends that wrap around the hook 9 and the loop 11 to keep them firmly attached to the harness. In this example, the lead keel is poured around a third U shaped bend 705 in order to keep the ballast component 601 firmly affixed to the buoyancy component 603.

Figure 8:
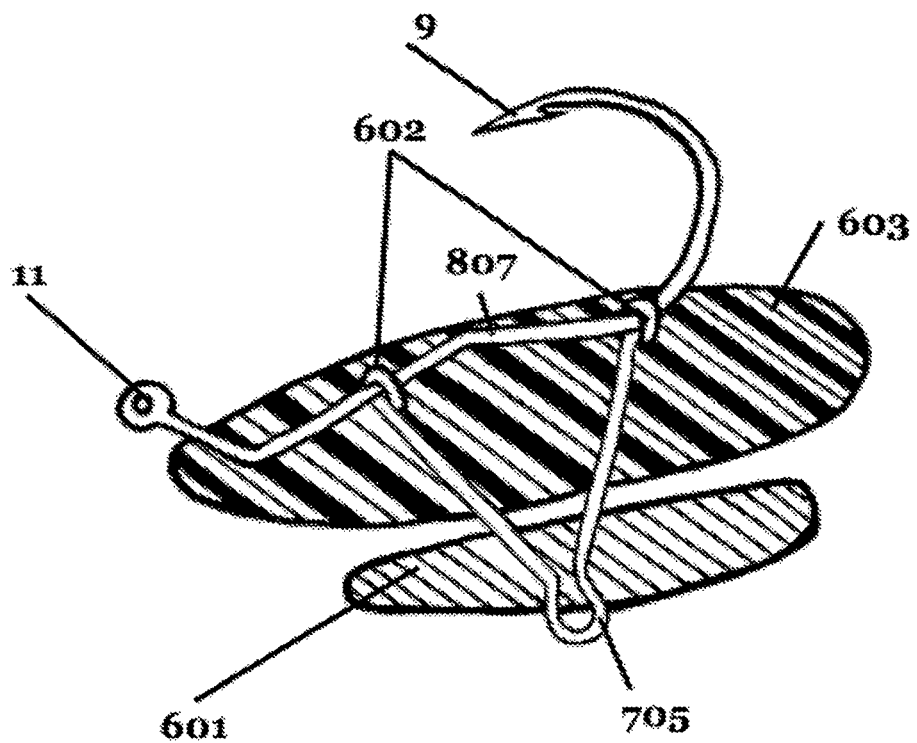
FIG. 8 is a cross sectional view of a harness comprising a buoyancy-ballast system with an adjusted hook angle. This harness is intended for use in bluegill and similarly shaped embodiments.

FIG. 8 also illustrates a cross sectional view of the harness. Similar to the harness depicted in FIG. 7, this embodiment contains a wire 602 for connecting the buoyancy component 603 to the ballast component 601 and for securing the hook 9 and the loop 11 to the harness. This embodiment also contains a wire 602 with three U shaped bends, two bends for securing the hook 9 and loop 11 to the harness and one bend 705 for keeping the ballast component 601 attached to the buoyancy component 603. This embodiment also contains another bend 807 for improving the hookup angle in lures with tall body shapes, for example the bluegill in FIG. 4. The additional bend in this embodiment sets the hook at a recessed angle relative to hook in FIG. 7. As a result, the hook sits parallel to the top edge of the taller body portion to maintain a consistent hook angle despite the taller lure body shape.

Figure 9:
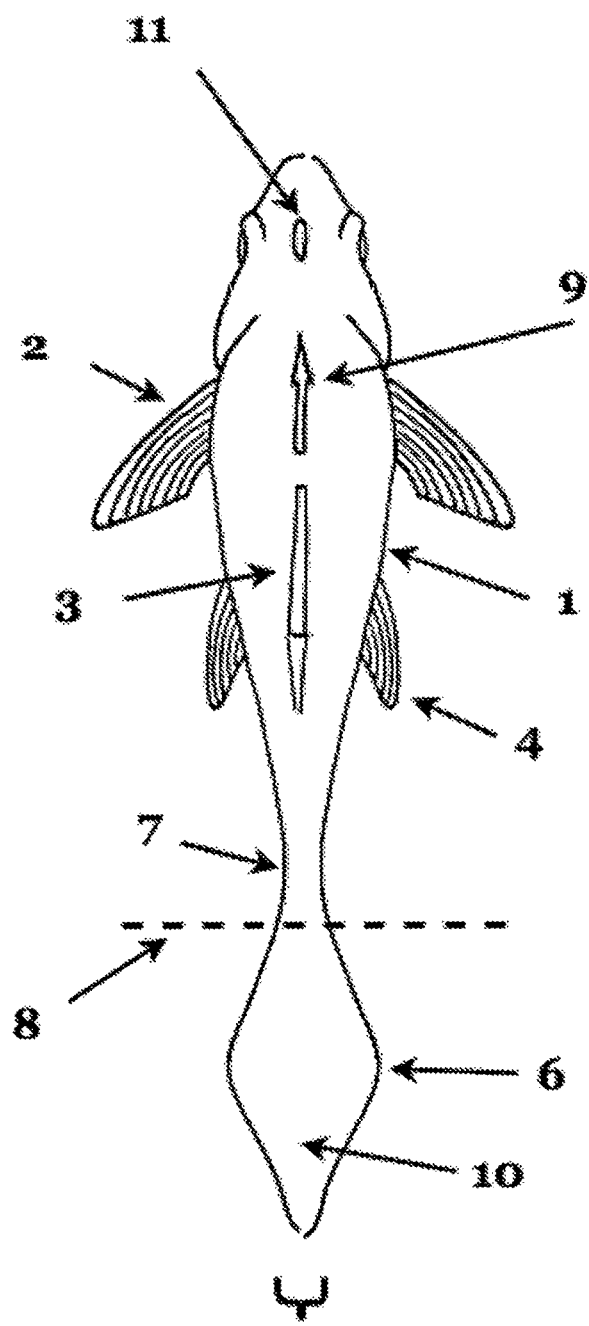
FIG. 9 is an overhead perspective view of a lure embodiment with a body portion designed to resemble a generic baitfish and a tail portion shaped like tail design 1.

FIG. 9 illustrates the top view of a preferred fish lure embodiment. From this angle, the horizontal length and grooved outer surface of the pectoral fins 2 and pelvic fins 4 are clearly visible. The anal fin, however, is completely obstructed by the oversized caudal fin 6. While most structures of this embodiment are intended to mimic naturally occurring prey fish species, the pectoral fins 2 and pelvic fins 4 extend outwardly from the fish body 1 much further than in naturally occurring fish of this size. In this example, the elongated pectoral fins 2 and pelvic fins 4 provide increased horizontal and vertical movement of the fish lure as it moves through the water. This additional movement is called secondary action and supplements the swimming action of the lure's tail portion and fluttering movement of the caudal fin 6. The pectoral fins 2 and pelvic fins 4 also enhance the lure's stability by increasing its form drag. As provided in Bernoulli's equation, by making the lure shape less streamlined, the pelvic and pectoral appendages decrease the water's flow velocity around the lure and thereby increase the pressure on the sides of the fish body 1. This relative increase in pressure is exerted inwardly on the fore most part of the lure to keep the fish body portion 1 upright in the water and ensure the lure tracks straight during retrieval. Maintaining an upright position and straight path of trajectory enhances the life-like swimming and diving motion of the lure particularly upon retrieval and as it sinks to a desired fishing depth after cast or is jigged in a slow enticing fashion. Other non-naturally occurring fish features that may be found in this embodiment include a jig hook 9, optionally positioned just to the fore of the dorsal fin 3, and a loop 11, extending upwardly from the fish head. Both of theses structures may be attached to a harness embedded in the fish lure body.

The illustration in FIG. 9 contains a dividing line 8 splitting the portion of the lure aft the dorsal fin 3 into two sections—the forked tail portion and the tail base portion. Just before the dividing line 8, the fish body tapers to a very narrow tail neck 7 before swelling into an oversized caudal fin 6 comprised of tail forks 10. In this embodiment, the tail forks 10 taper from the fore most portion of the caudal fin 6 to the aft most point of the fish body at the rear of the caudal fin 6. Relative widths of the tail neck 7, caudal fin 6, and fish body 1 are clearly marked at the bottom of FIG. 9. In this embodiment, the width of the tail neck 7 is roughly one-fourth the width of the caudal fin 6 and one-fifth the width of the fish body 1. Accordingly, the width of the caudal fin 6 is about eighty percent or four-fifths of the fish body's width.

In this example, the relative breadth of the tail neck 7, caudal fin 6, and fish body 1 influence the lure's drag coefficient and thereby have an important impact on the rotational movement and fluttering action of the lure's tail portion. Regarding form drag coefficient, the broader fish body 1 and appendages 2 and 4 are significantly less streamlined than the much narrower tail neck 7. Additionally, the caudal fin 6 is much broader than the tail neck 7 but only twenty percent narrower than the fish body 1. This shape produces a much slower flow velocity around the lure body 1, appendages 2 and 4, and caudal fin 6 relative to the flow velocity around the tail neck 7. The decreased flow velocity around the broader portions of the lure, increases the pressure around these portions, while the increased flow velocity around the narrow tail neck 7 portion decreases the pressure exerted against the lure at this narrower section. As the lure moves through the water, these pressure variations cause the wider sections—with relatively low flow velocity and high pressure—to have very little lateral movement while the narrower sections—with relatively high flow velocity and low pressure—have significantly more lateral movement. Accordingly, when pulled through water, the relatively unpressurized, narrow tail neck 7 moves freely in a lateral direction and rotates by twisting around a central axis of rotation extending laterally from the aft most portion of the fish body 1. In some examples, this rotation is characterized by a fluttering motion consisting of simultaneous movement in a horizontal plane and a vertical plane. At high flow velocities, the lure's rotation is limited by the elasticity of the lure material as well as the counterbalancing pressure exerted on the broader caudal fin 6.

To enhance the lure's lateral swimming motion, the tail forks 10 component of the caudal fin 6 may optionally be tapered. In this example, the aft most portions of the tail forks 10 are as narrow as the tail neck 7 while the foremost portions of the tail forks 10 are eighty percent as broad as the fish body. This variation in breath means the aft most portion of the tail has a lower drag coefficient than the foremost portion of the tail. Accordingly, the aft most portion moves more freely than the foremost portion of the caudal fin 6. This ensures the lure's tail exhibits a sharp, twitchy swimming motion as it is pulled through the water with the more streamlined aft tail portion assisting the tail in accelerating back toward the center of the fish body from a position of maximum displacement. In turn, the relatively broad fore portions of the caudal fin stabilize the tail portion keeping the lure upright and allowing it to track straight while avoiding overly strenuous retrievals for fisherman.

Figure 10:
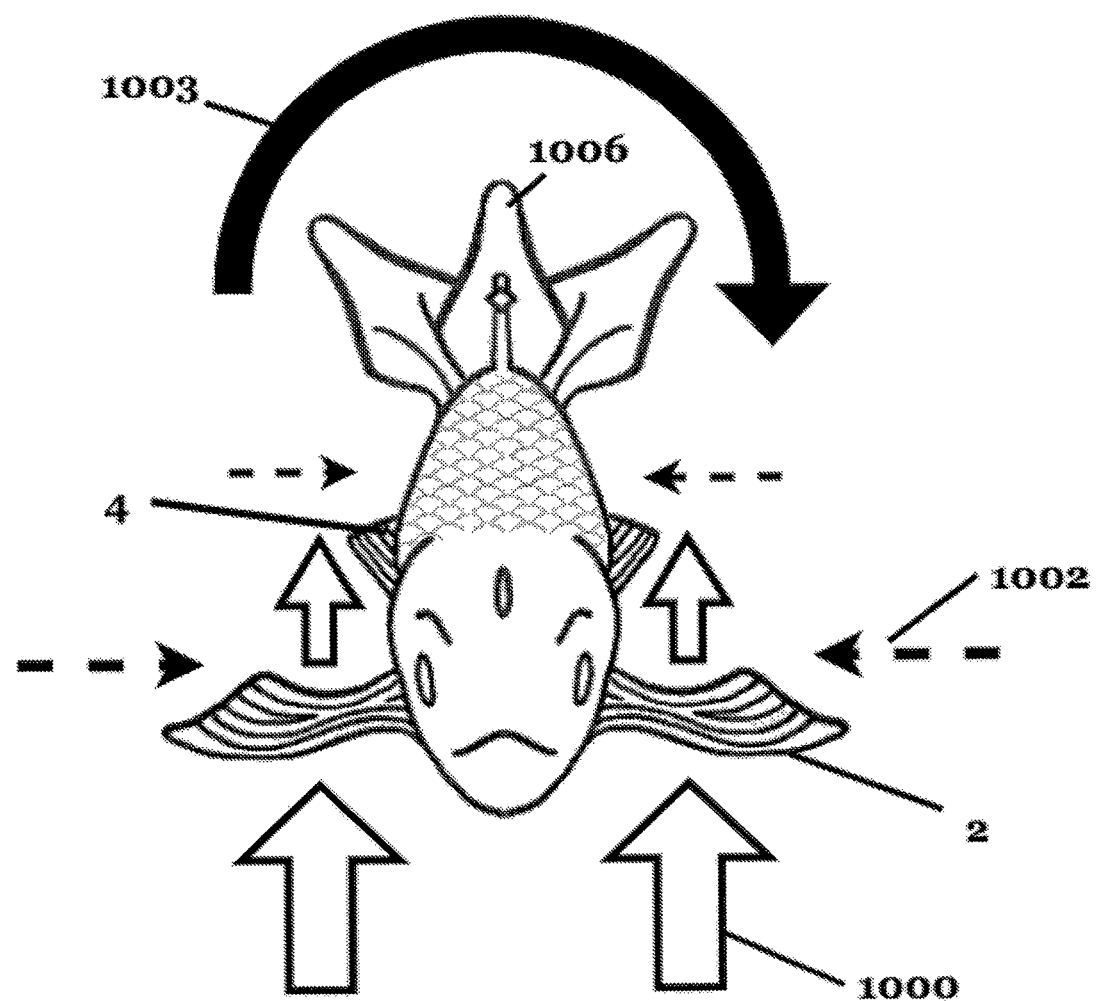
FIG. 10 is a front perspective view of a lure embodiment designed to resemble a generic baitfish.

FIG. 10 displays a front view of a fish lure embodiment and contains arrows depicting the flow velocity of water, hydrodynamic pressure caused by the flow velocity, and the rotational, fluttering movement of the lure's tail portion. The white arrows outlined in black depict the flow velocity of water around the fish lure embodiment 1000 as it moves in a forward or out from the page direction.

Flow velocity is generated as the lure is pulled through the water upon retrieval. This flow velocity is fastest around the most streamlined or narrowest portions of the lure and is reduced by structures that broaden the lure's shape such as fins extending outwardly from the lure's body. As provided in Bernoulli's equation, hydrodynamic pressure varies inversely with flow velocity. Therefore hydrodynamic pressure will be greatest in regions with the lowest flow velocity. In this example, the lure's broadest regions are located around the elongated pectoral fins 2, pelvic fins 4, and tail portion 1006. Accordingly, the hydrodynamic pressure is greatest in these regions and lower in areas immediately aft of these locations. The variable hydrodynamic pressure along the length of the lure body causes some regions of the lure to flutter while others remain static as the lure moves through the water. By imitating or, in some embodiments, surpassing the motion of live fish, this selective fluttering action attracts fish to the lure and induces them to take the hook.

In this example, the enlarged pectoral fins 2 and pelvic fins 4 restrict the flow of water around the fish lure 1000 thereby reducing flow velocity and locally increasing hydrodynamic pressure. The increased hydrodynamic pressure 1002 generated by the reduced flow velocity around the pectoral fin 2 and pelvic fin 4 structures is depicted using dashed arrows. Interactions between the flow of water around the fish lure 1000 and the varying hydrodynamic pressure 1002 may cause horizontal, vertical, or rotational displacement in some of the pectoral fins 2 and pelvic fins 4. In this embodiment, rotational displacement refers to some combination of horizontal and vertical displacement in which a structure moves in at least two directions. Texturing the outer surface of the pectoral fins 2 and pelvic fins 4 with grooves, as depicted in this embodiment, increases the skin fiction of these surfaces and raises the lure's overall drag coefficient. In turn the higher overall drag translates to move movement at high flow velocities. Texturing the fins also channels the flow of water around the lure to ensure a more consist, rhythmic movement of the appendages in water. Additionally, groove texturing stabilizes the lure as it travels in water by reducing the vibrational noise present in the flow of water around the lure. This stabilizing effect keeps the lure upright in the water, causes the bait to sink in a realistic horizontal fashion, and enhances the life-like swimming action of the bait upon retrieval.

The rotational direction of the tail portion's fluttering movement is also depicted in this figure. To help visualize this multi-plane rotation, the tail portion 1006 is illustrated in three positions. In the central position, the tail is horizontally centered with no rotation. The left position shows the tail's multi-plane left movement consisting of lateral movement to the left and anticlockwise rotation. The right position shows the tails multi-plane right movement consisting of lateral movement to the right and clockwise rotation. In this example, the tail's rotational movement is caused by varying the hydrodynamic pressure along the lure body. Other embodiments use different lure body and lure tail shapes as well as different surface textures to produce different degrees of lateral, vertical, and rotational motion. The shape and texture of lures in this invention can be customized to produce a specific motion optimized to attract a particular type of fish under certain water and weather conditions.

Preferred Tail Design Examples

Figure 11:
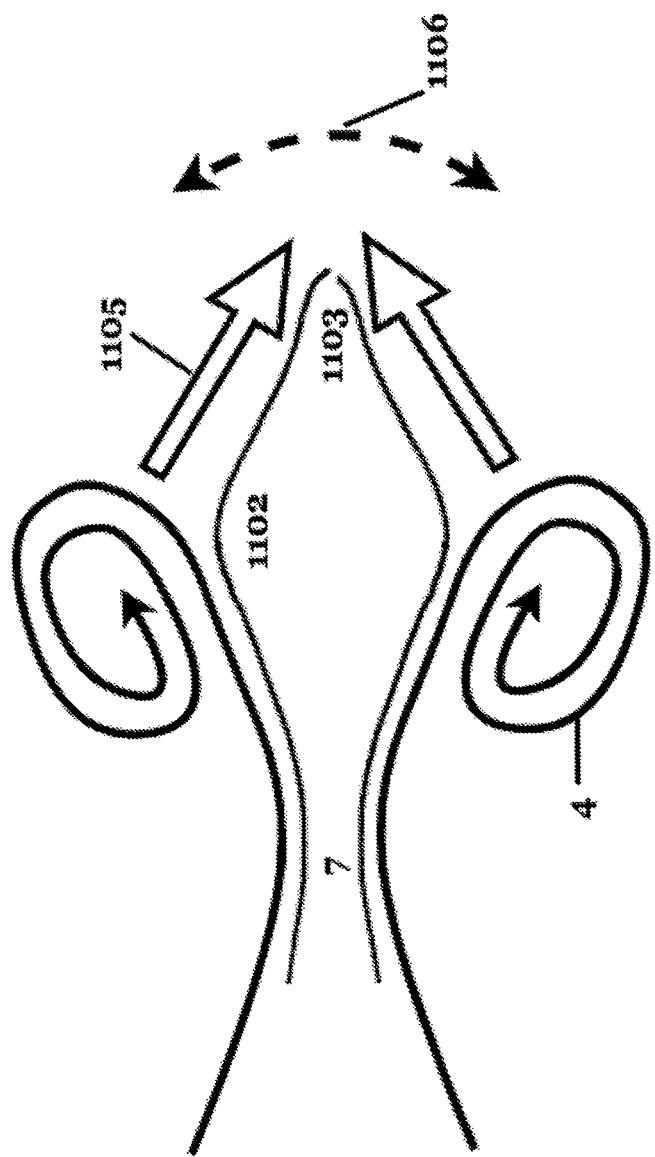
FIG. 11 is an overhead perspective view of tail design 1. This embodiment has a very narrow tail neck and a set of tail forks which taper from the tail fork apex to the tail fork terminal.
Figure 12:
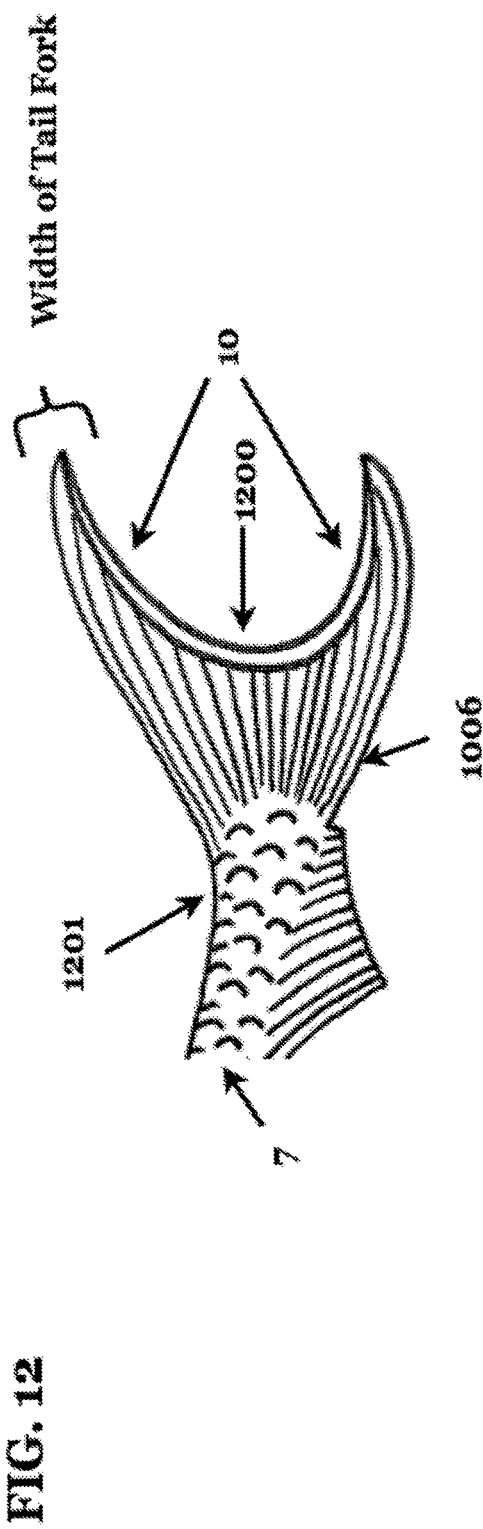
FIG. 12 is a side perspective view of tail design 1. This embodiment has a set of grooved, curved tail forks.

FIGS. 11-20 illustrate three example tail shape embodiments of the fish lure. The top and side views of each tail shape are shown in FIGS. 11-16, while each tail's movement as it is pulled through the water is shown in FIGS. 16-20. Each design described herein exhibits a fluttering motion when pulled through water. This fluttering motion includes both horizontal—x-axis—and vertical—y-axis—displacement, sometimes referred to as rotational movement. In some embodiments, the tail portion may only rotate a couple of degrees from center in the horizontal direction, vertical direction, or both. In other examples, rotation of the tail portion may be as great as 90 degrees in the horizontal direction, vertical direction, or both. All three tail designs may be attached to a trout, bluegill, catfish, baby bass, crappie, squaw fish, hitch, sculpin, shad or other bait fish body design in order to produce a lure optimized for attracting a particular species of fish. The three example tail designs disclosed herein are only a few of the preferred embodiments of this invention and one of ordinary skill in the art would recognize numerous other tail shapes can be configured to provide the same rotational or fluttering movement that characterizes lures made using this invention The first tail design is shown in FIGS. 11-12. FIG. 12 displays a side view and FIG. 11 illustrates an overhead view. As shown in FIG. 12, curved tail forks 10 and a ridgeline 1200 extending the full vertical length of the tail portion 1006 characterize this design. In this embodiment, the ridgeline acts as a type of rudder, which steers the tail portion 1006 in a lateral direction as it travels through the water. The three components visible from this perspective that provide the distinct fluttering movement of this lure are the width of the tail neck 7, the width of the tail forks 10, and the angle or slope of the intersection between the tail neck and the tail forks 1201. Relative to other lure embodiments, this example has a very thin tail neck 7, very thick but tapered tail forks 10, and a steep angle of intersection 1201 between the tail neck 7 and the tail forks 10.

The width of the tail neck 7 affects rate of tail oscillation and rotational degrees of freedom of the tail portion 1006 by impacting the lure's form drag coefficient. The ticker the tail neck, the higher the form drag coefficient and the slower the flow velocity around this portion of the lure. At slower flow velocities, the pressure exerted by the flow of water around the tail neck is increased reducing the rate of tail oscillation and minimizing the tail portion's rotational degrees of freedom. The width of the tail neck 7 in this embodiment is very narrow in order to increase flow velocity, reduce water pressure, and increase the rate and magnitude of lateral tail movement. The width of the tail forks 10 affect the lure's drag coefficient and tail movement in much the same way as the width of the tail neck 7. The thicker the tail forks 10 the higher the drag coefficient and the lower the rate and magnitude of tail displacement.

In this example, the tail forks 10 are quite thick and comprise the widest part of the lure. Accordingly, the fluttering movement of the tail portion 1006 in this design is not as pronounced as typically observed in embodiments comprising tail designs 2 and 3. However, the exaggerated width of the tail forks 10 stabilizes the tail portion 1006 as it moves through the water. Accordingly, most of the vertical displacement of the fluttering movement is not observed in embodiments comprising tail design 1. Instead, the tail portion 1006 of these lures move almost entirely in a lateral direction with only a few degrees of vertical displacement. Although the magnitude of the tail movement in embodiments comprising tail design 1 is reduced by the width of the tail forks 10, the rate of tail oscillation is still several times per second at most retrieval velocities due to the very narrow tail neck 7.

The angle of intersection between the tail neck and tail forks 1201 also affects the displacement of the tail portion by introducing interference drag. Steeper angles of intersection 1201 result in more sudden changes in flow velocity and therefore provide for greater interference drag. In some embodiments, the combination of greater form drag caused by thick tail forks 10 combined with interference drag generated by steep angles of intersection can cause separation of the boundary layer. If the boundary layer is separated, the flow around the lure will change from streamlined to turbulent resulting in the formation of eddies and vortices. In some embodiments, this turbulent flow pattern is an important component of the vertical displacement portion of the fluttering movement. The steeper the angle of intersection between the tail neck and tail forks 1201 the stronger the eddy effect and the more water pressure exerted on the tail portion 1006. Accordingly, steeper angles of intersection result in more tail portion displacement as the lure moves through the water.

FIG. 11 displays an overhead view of tail design 1. From this perspective, the width of the tail forks relative to the tail neck 7 is clearly visible. Additionally, the full shape of the tail portion is visible including it's taper from tail fork apex 1102 to tail fork terminal 1103. This tapered shape reduces drag at the very end of the tail portion to help this design maintain a high rate of oscillation despite having a relatively wide tail fork apex 1102. Moreover, the tapered shape increases the magnitude of lateral tail movement by reaccelerating water toward the aft most portion of the tail. This acceleration increases flow velocity and decreases pressure at the end of the tail giving it move freedom to move laterally. The acceleration of water due to tapering is depicted by white arrows outlined in black 1105 and the horizontal movement of the tail portion in design 1 is depicted using a dashed arrow 1106.

Figure 17:
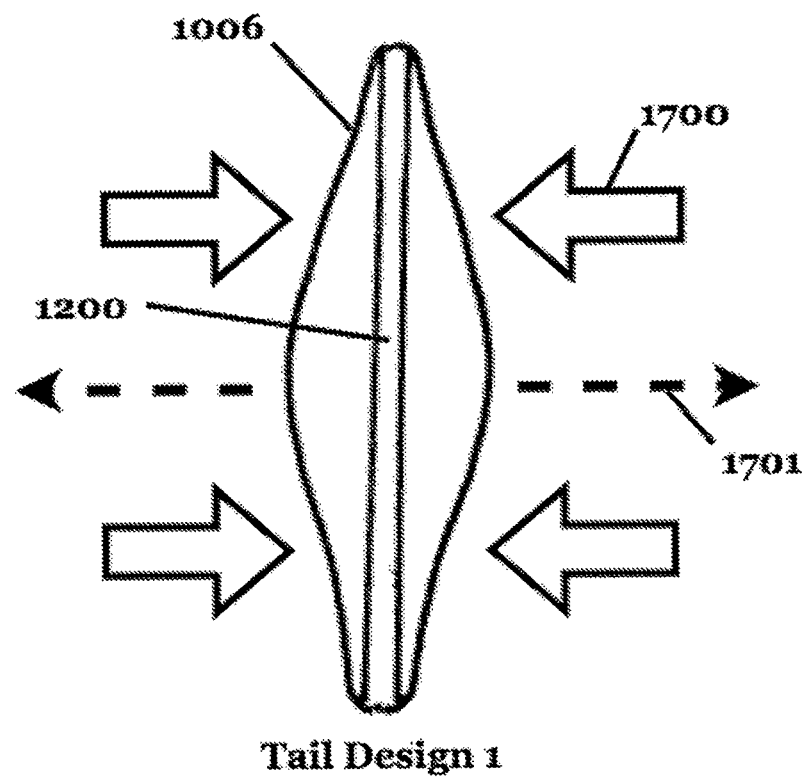
FIG. 17 is a rear view perspective of tail design 1. The arrows depict the flow of water around and against the ridgeline.
Figure 18:
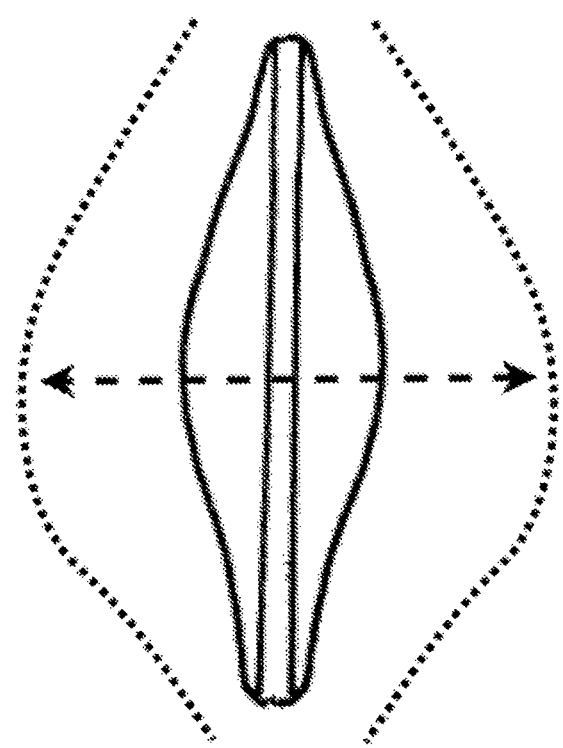
FIG. 18 is a rear view perspective of tail design 1 depicting a portion of the tail shape's range of motion

The mostly horizontal fluttering motion produced by this embodiment of tail design 1 is depicted in FIG. 17. The tail portion moves left and right in an alternating fashion up to 45 degrees from center along a mostly lateral trajectory. FIG. 17 illustrates one example of the ridgeline's 1200 rudder effect which prevents most of the vertical movement by stabilizing the tail portion 1006 and steering the flow of water around the aft most part of the lure. In this embodiment, the tail portion 1006 has a crescent shape and the ridgeline 1200 mirrors this crescent shape by curving along the full length of the tail portion's 1006 interior surface. In the drawing, white arrows outlined in black represent the flow of water around the tail portion 1700 and a dashed arrow 1701 represents the ridgeline's rudder effect of steering water around the rear of the lure. This interaction between the flow of water around the tail portion 1700 and the rudder effect of the ridgeline 1200 provides a primarily lateral fluttering motion as the lure is pulled through the water. To summarize, tail design 1 is designed to maximize frequency of oscillation and magnitude of horizontal or x-axis displacement. The tail fork ridgeline, narrow tail neck, thick tail forks, steep angle of intersection between the two and tapering from tail fork apex to tail fork terminal all combine to achieve this effect. As a result, embodiments comprising tail design 1 will work best in settings where rapid, horizontal tail displacement is especially attractive to fish.

Figure 13:
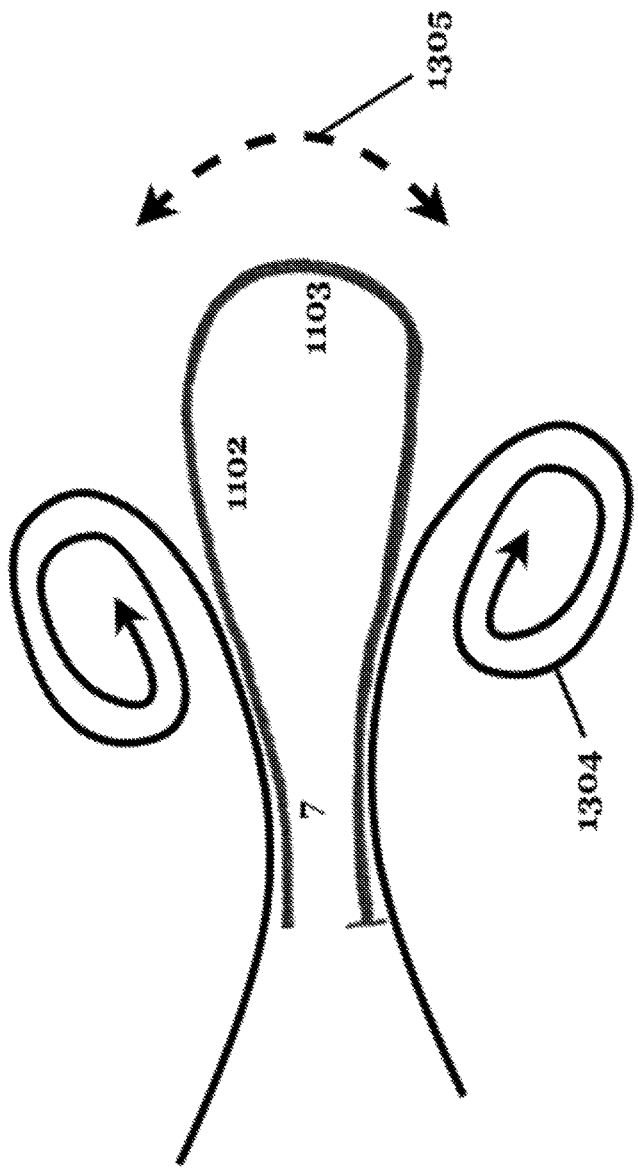
FIG. 13 is an overhead perspective view of tail design 2. This embodiment has a set of tail forks with massive rounded terminal portions.
Figure 14:
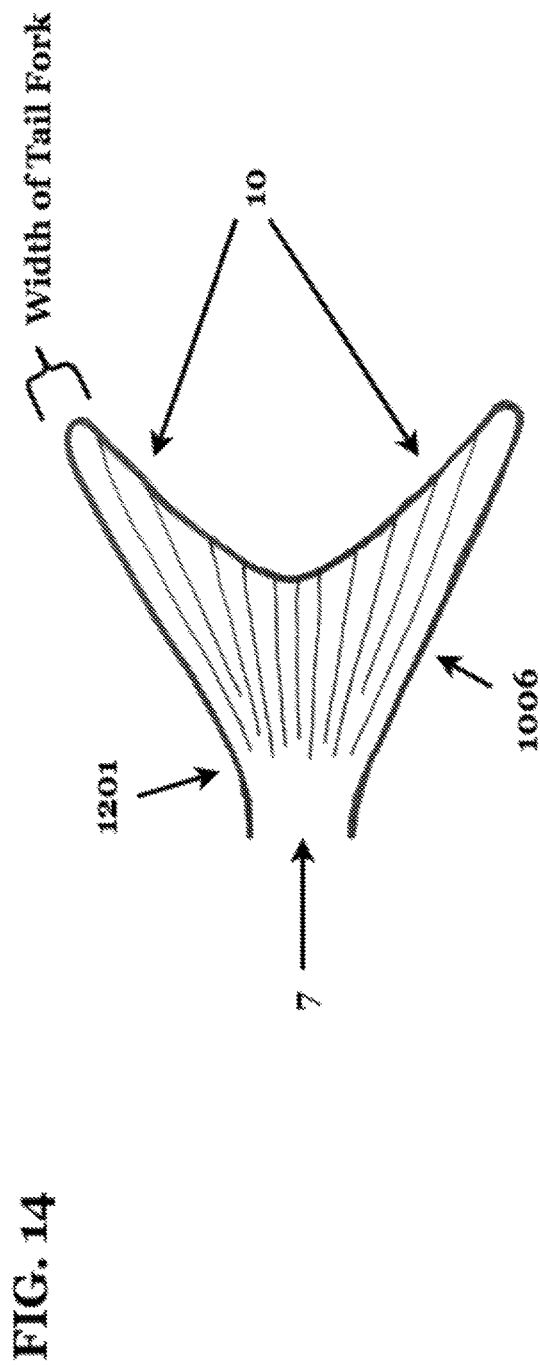
FIG. 14 is a side perspective view of tail design 2. This embodiment has no ridgeline extending down the vertical middle of the tail portion's hind surface.

The second tail design is shown in FIGS. 13-14. FIG. 13 illustrates an overhead view and FIG. 14 depicts a side view. As shown in FIG. 14, the tail forks 10 of this design are straighter than in tail design 1 and there is no ridgeline protruding vertically from the center of the tail portion 1006. Additionally, most of the mass of the tail forks 10 is concentrated in curved lobes comprising the tail fork terminals. The additional mass of the tail fork terminals relative to the thinner interior portion of the tail forks cause the terminals of both tail forks to move laterally to the same side and flex in opposing vertical directions. Other characteristics of this example include a ticker tail neck 7 and a slightly shallower angle of intersection 1201 between the tail neck 7 and tail forks 10. These features differentiate tail design 2 from the two other tail designs disclosed herein.

The straight tail forks 10 make the tail portion of this design less streamlined and increase the lure's form drag coefficient. The increased drag slows flow velocity and increases pressure around the tail forks 10 causing the tail forks in embodiments comprised of a soft polymer of silicone material to flex and move vertically. Accordingly, tail design 2 achieves the most vertical displacement of the three examples presented. The lack of a vertical ridgeline producing from the center aft most portion of the tail further enhances the vertical movement in this design's fluttering action. With no ridgeline rudder to stabilize the tail portion 1006 and steer the flow of water around the aft most portion of the lure, this embodiment flutters by moving laterally left and right and vertically top to bottom up to 90 degrees along a horizontal axis extending outwardly from the center of the tail portion 1006.

Figure 19:
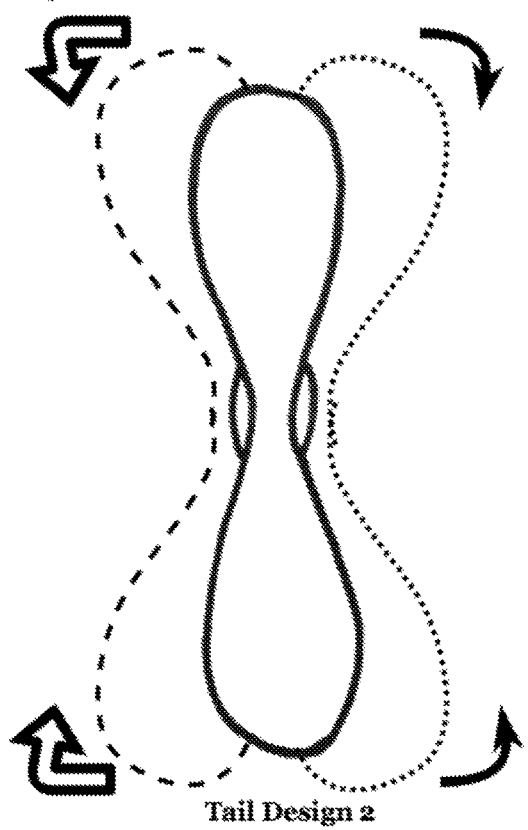
FIG. 19 is a rear view perspective of tail design 2 depicting both the rotational and lateral elements of the tail shape's range of motion.

One example of this fluttering motion is illustrated in FIG. 19. Here, the tail forks move in the same horizontal direction but opposite vertical direction. The tail's left fluttering movement is illustrated by a dashed line indicating lateral displacement and white arrows outlined in black indicating the direction of the tail's vertical displacement. The tail's right fluttering movement is represented by a dotted line indicating lateral displacement and black arrows indicating the direction of the tail's vertical displacement.

The overhead perspective illustrated in FIG. 13 helps to explain how tail design 2 delivers this unique motion. In this example, the tail neck 7 is only slightly thicker than in tail design 1 meaning flow velocity is streamlined, pressure is relatively low, and range of motion is maintained in this region of the tail portion. However, unlike the tail fork taper in design 1, the tail forks of this embodiment expand from tail fork apex 1102 to tail fork terminal 1103 so that the aft most portion of the tail fork is the thickest and has the highest form drag coefficient. Due to this shape, flow velocity is slowest and pressure lowest at the aft most portion of the tail fork.

In at least one embodiment of this design, expanding the tail fork from apex 1102 to terminal 1103 increases vertical and horizontal displacement of the tail forks up to 90 degrees from center. The eddy effect 1304 created by the combination of form and interference drag created by the steep angle of intersection between the tail neck 1201 and tail forks enhances the tail portion's fluttering range of motion 1305 by separating the boundary layer to create a region of turbulent flow toward the rear of the tail portion. To summarize, tail design 2 is designed to maximize magnitude of vertical or y-axis displacement while maintaining a high frequency of oscillation and magnitude of horizontal or x-axis displacement. The absence of a tail fork ridgeline, slightly thicker tail neck, thick tail forks, slightly shallower angle of intersection between the tail neck and tail fork, and expanding tail fork thickness from apex to terminal all combine to achieve this effect. As a result, embodiments comprising tail design 2 will work best in settings where rapid, vertical and horizontal tail displacement, alternating right-left identical horizontal displacement of tail fork ends, and opposing vertical displacement of tail fork ends is especially attractive to fish.

Figure 15:
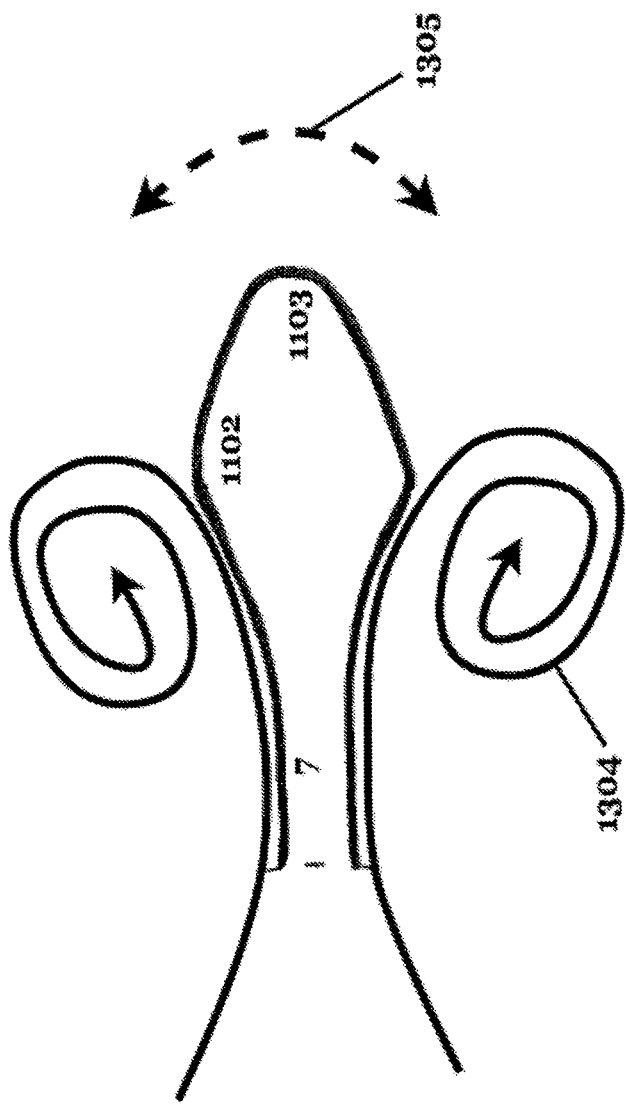
FIG. 15 is an overhead perspective view of tail design 3. This embodiment has a set of tail forks which taper from tail fork apex to tail fork terminal.
Figure 16:
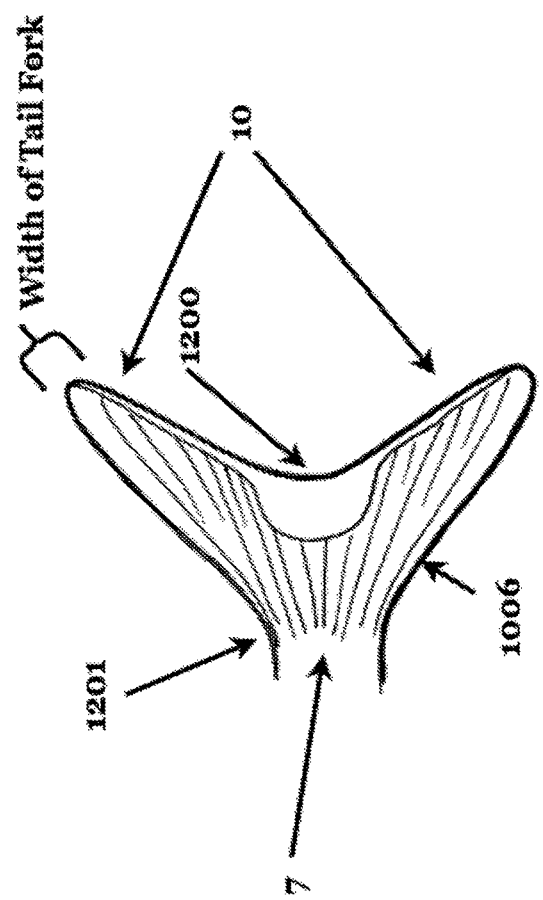
FIG. 16 is a side perspective view of tail design 3. This embodiment has a ridgeline extending down the vertical middle of the tail portion's hind surface.

FIGS. 15-16 illustrate the third tail design disclosed herein. FIG. 15 displays an overhead view and FIG. 16 depicts a side view. As shown in FIG. 16, the tail forks 10 are straight and the tail portion 1006 has a ridgeline 1200 extending vertically along the centerline of the entire length of the tail forks 10. As in tail design 2, the tail neck 7 is slightly thicker than in tail design 1, but in this embodiment the difference in tail neck thickness does not significantly affect the rate or magnitude of tail oscillation. Tail design 3 has the steepest angle of intersection 1201 between the tail forks 10 and the tail neck 7. The severe slope increases the lure's form and interference drag coefficients in this region and makes the eddy effect 1304 depicted in FIG. 15 easier to produce at lower pull velocities. The steep angle of intersection and straight—non-curved or streamlined—shape of the tail forks combine to give this design a fluttering motion with significant vertical movement despite the presence of a stabilizing ridgeline. The tapered shape of the tail forks is also visible in FIG. 15 with the tail fork apex 1102 comprising the widest portion of the tail forks before narrowing to the tail fork terminal 1103. As in tail design 1, this tapered shape increases lateral movement of the tail portion by increasing flow velocity and decreasing pressure at the aft most portion of the lure.

Figure 20:
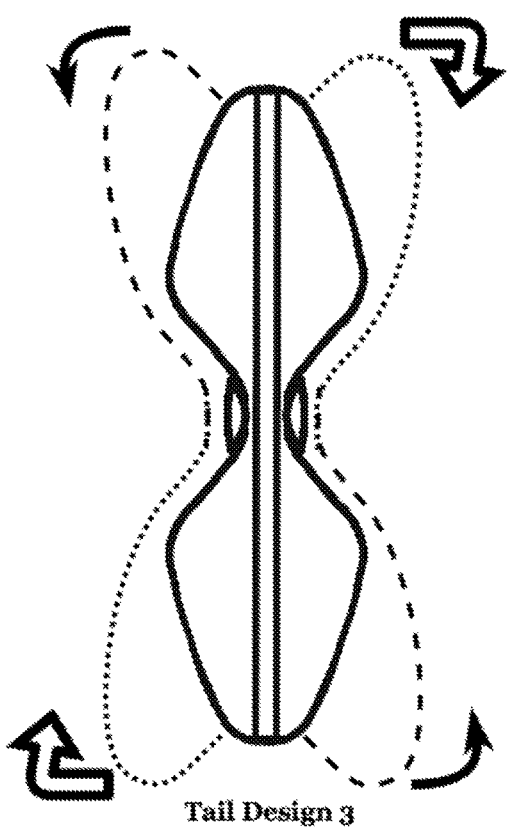
FIG. 20 is a rear view perspective of tail design 3 depicting both the rational and lateral elements of the tail shape's range of motion.

FIG. 20 illustrates the fluttering motion produced by tail design 3. Similar to lures with tail design 2, embodiments comprising tail design 3 exhibit a fluttering motion with significant vertical and horizontal motion. Here, a dotted line represents the clockwise oscillation and white arrows outlined in black represent the direction of movement. A dashed line represents the counter clockwise oscillation and black arrows depict the direction of movement. The fluttering movement of tail design 3 is characterized by the opposite direction of tail fork rotation. Accordingly, as the top end flutters horizontally to the left and vertically downward from center, the bottom end flutters horizontally to the right and vertically upward from center. The ridgeline and tapered tail forks of this design, combine to move the tail fork ends in this unique pattern.

To summarize, tail design 3 maintains a high frequency of oscillation, a high magnitude of vertical or y-axis displacement, and a high magnitude of horizontal or x-axis displacement. The tail fork ridgeline, slightly thicker tail neck, thick tail forks, steep angle of intersection between the tail neck and tail forks, and tapering of tail fork thickness from apex to terminal all combine to achieve this effect. As a result, embodiments comprising tail design 3 will work best in settings where rapid, vertical and horizontal tail displacement in alternating clockwise and counter-clockwise directions with opposing tail end movements is especially attractive to fish.

In addition to the shape of the tail, the flexibility and surface texture of the lure material significantly impacts tail movement. For example, silicon is a more durable and flexible material than plastol or other soft plastics. Therefore, lures made from silicon tend to have higher frequencies of oscillation and greater ranges of motion than lures of the same shape made from plastol. In general, the more flexible the tail material and more textured the surface of the lure the more form drag and skin friction. In turn, these higher drag coefficients produce greater magnitude of tail movement.

Although the invention has been described in terms of the above embodiments, many changes, variations, substitutions, and alterations would be obvious to one of ordinary skill in the art. Obvious variations that produce the same effects as described above are intended to fall within the scope of the present invention. Accordingly, in other embodiments the shape, surface texture, and material of the tail portion or entire lure may be modified to customize the rate and magnitude of tail oscillation as well as the amplitude of horizontal, vertical, rotational, or fluttering displacement. The scope of the invention is, therefore, not limited by the foregoing but rather is defined by the following claims.

What is claimed is:

1. A fish lure comprising:
   a forward body portion and an aft soft silicone tail portion extending from the rear of the body portion;
   a harness embedded in the forward body portion, the harness comprising a buoyancy-ballast system having a buoyancy component for keeping the lure upright and buoyant in the water and a ballast component for causing the lure to sink in an upright position without rolling;
   the soft silicone tail portion having a set of tail forks, a tail neck, a tapered angle of intersection between the tail forks and the tail neck, and a ridgeline extending out from the surface of the soft silicone tail portion down a vertical middle section of the soft silicone tail portion's hind surface and along the full vertical length of the soft silicone tail portion, wherein the tail forks, tail neck, and the tapered angle of intersection between the tail forks and tail neck cause the tail portion to perform a fluttering movement as the fish lure travels through water, wherein the ridgeline acts as a rudder steering the soft silicone tail portion in a lateral direction as it travels through the water,
   the fluttering movement including an anticlockwise rotation occurring when the tail portion moves laterally to the right and a clockwise rotation when the tail portion moves laterally to the left.

2. The fish lure of claim 1, wherein the body portion made from at least one of soft plastol, soft polymer, or soft silicone.

3. The fish lure of claim 1, wherein the body portion is shaped like a shad, trout, bluegill, catfish, baby bass, cappie, squaw fish, hitch, sculpin, or other bait fish.

4. The fish lure of claim 1, wherein the buoyancy comprises a resin and microsphere core, the buoyancy component further for fixing a hook to the harness so that the hook does not wobble or loosen after being fished.

5. The fish lure of claim 4, wherein the buoyancy-ballast system comprises a wire for joining the ballast component to the buoyancy component, the wire further for connecting the hook to the buoyancy component, wherein the hook attaches to the wire embedded in the buoyancy component using two open ended u shape bends.

6. The fish lure of claim 5, wherein the body portion has a bluegill shape and the buoyancy-ballast system comprises a bent hook, the bent hook for improving a lure hook up ratio by keeping the hook tip parallel to the top surface of the body portion.

7. The fish lure of claim 1, further comprising at least one of a grooved, scaled, or otherwise textured body portion or tail portion.

8. The fish lure of claim 1, wherein the tail portion comprises a set of tail forks, the tail forks comprising curved tips that increase in thickness as they extend away from a tail fork base, the tail forks further having more mass around a tail fork terminal relative to a tail fork apex for producing a fluttering motion wherein the primary axis of rotation extends longitudinally from the center of the tail portion.

9. The fish lure of claim 1, wherein the tail portion comprises a thin tail neck and a set of thick, curved tail forks tapering from tail fork apex to tail fork terminal, the tail portion, tail neck, and tail forks for fluttering by pivoting laterally around a thin tail neck and rotating in alternating clockwise counter clockwise oscillations around an axis of tail fork rotation extending outwardly from the tail portion's center.

10. The fish lure of claim 1, wherein a rudder effect causes the ridgeline to prevent most vertical movement of the soft silicon tail portion, the rudder effect comprising stabilizing the tail portion and steering the flow of water around the aft most part of the fish lure.

11. The fish lure of claim 1, wherein the clockwise rotation and the anticlockwise rotation move a top end and a bottom end of the tail forks in different vertical directions, wherein the top end flutters horizontally left and vertically down from a center position during the clockwise rotation and the bottom end flutters horizontally right and vertically up from the center position during the anticlockwise rotation.

12. A fish lure comprising:
a forward body portion and an aft tail portion extending from the rear of the body portion;
a harness embedded the forward body portion, the harness comprising a buoyancy-ballast system having a buoyancy component keeping the lure upright and buoyant in the water and a ballast component causing the lure to sink in an upright position without rolling;
the tail portion having a set of tail forks, a tail neck, an angle of intersection between the tail forks and the tail neck, and a ridgeline extending out from a center portion of an aft surface of the tail portion down the tail portion's entire length, wherein the tail neck, the angle of intersection between the tail neck and the tail forks, and the ridgeline cause the tail portion to perform a fluttering motion as the fish lure travels through water, the fluttering motion comprising a multi-plane movement including a right to left lateral movement and a clockwise to anticlockwise rotation, wherein an anticlockwise rotation occurs when the tail portion moves laterally to the left and a clockwise rotation occurs when the tail portion moves laterally to the right.

13. The fish lure of claim 12, wherein the set of tail forks have a thickness of at least 80 percent of the body portion's thickness.

14. The fish lure of claim 12, further comprising a rotational aspect and a horizontal aspect occurring simultaneously, the rotational aspect rotating the tail portion relative to a vertical center and the horizontal aspect moving the tail portion laterally in alternating right to left and left to right oscillations.

15. The fish lure of claim 12, wherein the lateral right to left motion and the clockwise to anticlockwise rotation occur simultaneously.

16. The fish lure of claim 12, wherein the clockwise to anticlockwise rotation moves a top end and a bottom end of the tail forks in different vertical directions, wherein the top end flutters horizontally left and vertically down from a center position and the bottom end flutters horizontally right and vertically up from the center position.

* * * * *